United States Patent
Guillet et al.

(10) Patent No.: US 8,108,146 B2
(45) Date of Patent: Jan. 31, 2012

(54) METHOD AND DEVICE FOR DETERMINING A CONSOLIDATED POSITION OF A TRAVELING OBJECT, PARTICULARLY AN AIRCRAFT

(75) Inventors: Alain Guillet, Blagnac (FR); Ridha Chaggara, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 209 days.

(21) Appl. No.: 12/663,284

(22) PCT Filed: Jun. 16, 2008

(86) PCT No.: PCT/FR2008/000831
§ 371 (c)(1),
(2), (4) Date: Dec. 6, 2009

(87) PCT Pub. No.: WO2009/010651
PCT Pub. Date: Jan. 22, 2009

(65) Prior Publication Data
US 2010/0169005 A1      Jul. 1, 2010

(30) Foreign Application Priority Data
Jun. 25, 2007   (FR) .................................. 07 04529

(51) Int. Cl.
*G01C 21/00* (2006.01)
(52) U.S. Cl. ......... 701/214; 701/200; 701/216; 701/225

(58) Field of Classification Search .................. 701/200, 701/214, 216, 225
See application file for complete search history.

(56) References Cited

U.S. PATENT DOCUMENTS

| | | | |
|---|---|---|---|
| 5,383,127 A * | 1/1995 | Shibata | 701/216 |
| 5,906,655 A | 5/1999 | Fan | |
| 6,092,033 A | 7/2000 | Uhlmann | |
| 6,437,737 B1 * | 8/2002 | Azzarelli et al. | 342/360 |
| 6,502,042 B1 | 12/2002 | Eid | |
| 6,724,343 B2 * | 4/2004 | Asher et al. | 342/357.23 |
| 7,865,391 B2 * | 1/2011 | Martinez-Olague et al. | 705/13 |
| 2003/0045302 A1 * | 3/2003 | Oda et al. | 455/456 |
| 2003/0201934 A1 * | 10/2003 | Asher et al. | 342/357.12 |
| 2006/0114151 A1 * | 6/2006 | Iwami | 342/357.06 |
| 2007/0216364 A1 * | 9/2007 | Martinez-Olague et al. | 320/132 |

OTHER PUBLICATIONS

International Search Report dated Dec. 10, 2008 w/ English translation.
Written Opinion of the International Searching Authority with English translation.

* cited by examiner

*Primary Examiner* — Hussein A. Elchanti
(74) *Attorney, Agent, or Firm* — Dickinson Wright PLLC

(57) ABSTRACT

A method and device for determining a consolidated position of a travelling object check the coherence of position values corresponding to a current position of the travelling object and determine a consolidated position for the travelling object based on the coherent position values.

9 Claims, 3 Drawing Sheets

METHOD AND DEVICE FOR DETERMINING A CONSOLIDATED POSITION OF A TRAVELING OBJECT, PARTICULARLY AN AIRCRAFT

FIELD OF THE INVENTION

The present invention relates to a method and a device for determining a consolidated position of a traveling object, particularly an aircraft, especially a transport airplane.

More precisely, within the framework of the present invention, the consolidated position represents an accurate and reliable position which is determined on the basis of a plurality of position values which each represent one and the same current position of the traveling object and which are produced by various position generating means onboard the traveling object.

BACKGROUND OF THE RELATED ART

It is known that on a commercial airplane, the position of the airplane is generally calculated on the basis of several types of positioning systems (or position generating means), in particular an Inertial Reference (IR) system, an Air Data Reference (ADR) system, and GNSS means which form part of a satellite positioning system of GNSS type ("Global Navigation Satellite System"). These GNSS means generally possess an integrity monitoring algorithm of RAIM type ("Receiver Autonomous Integrity Monitoring") which makes it possible, by virtue of the redundancy of satellites, to determine the integrity of a calculated position. Moreover, the IR and ADR systems and the GNSS means are usually hybridized in the IR system, and this IR system generally comprises an algorithm of AAIM type ("Aircraft Autonomous Integrity Monitoring") which makes it possible, by virtue of the different and complementary characteristics of these three IR, ADR and GNSS assemblies, to determine the integrity of a calculated position of the airplane. Errors or faults of a satellite forming part of the GNSS system can be detected and excluded in real time using these RAIM and AAIM algorithms.

Nevertheless, these RAIM and AAIM algorithms do not make it possible to detect (and to exclude) errors or faults of the systems onboard the airplane, that is to say the IR system, the ADR system or a customary receiver associated with the GNSS system. Now, such errors or faults may cause the calculation of an erroneous position of the airplane.

SUMMARY OF THE INVENTION

The object of the present invention is to remedy these drawbacks. More particularly, its object is to detect and to exclude errors or faults of position generating means carried onboard a traveling object, for example of IR and ADR systems and/or of a GNSS receiver carried onboard an aircraft. The aim of the present invention is also to calculate a very accurate and dependable position of the traveling object, and it must especially be able to be implemented as a complement to the aforesaid RAIM and AAIM algorithms.

The present invention relates therefore to a method for determining a particularly accurate, dependable and reliable consolidated (current) position of a traveling object, particularly an aircraft, doing so on the basis of a plurality of position values which each represent the same current position of said traveling object.

For this purpose, according to the invention, said method is noteworthy in that:

a) consistency tests are carried out to verify the consistency of all the pairs of position values, which are formed on the basis of said position values taken into account, a consistency test applied to a pair of position values consisting:

in calculating the distance between the two position values of this pair;

in comparing this distance with a threshold value; and in considering this pair to be consistent if and only if this distance is less than or equal to this threshold value;

b) from among the various pairs which are considered to be consistent in step a), a pair of position values exhibiting the best reliability is identified by implementing at least one performance test; and c) said consolidated position of the traveling object, as well as a probability space which is associated with this consolidated position value and which illustrates its integrity, are calculated on the basis of said pair of position values exhibiting the best reliability.

Thus, by virtue of the invention, a method of consolidation is implemented which makes it possible to determine a consolidated position of the traveling object (in particular of an aircraft), which represents a particularly accurate, reliable and dependable (current) position thereof. This makes it possible to remedy the aforesaid drawbacks.

Moreover, this method (of consolidation) in accordance with the invention also makes it possible to determine a probability space which is associated with the calculated consolidated position and which illustrates its integrity. More precisely, within the framework of the present invention, a probability space which is associated with an arbitrary position (consolidated position or position value) of a traveling object, is centered around this position and defines the volume in which, with a probability greater than a predetermined threshold (for example $10^{-7}$/flying hour or $10^{-9}$/flying hour), the actual position of the traveling object is situated.

Furthermore, to implement the method in accordance with the invention it is not necessary for the existing systems (especially the computers) to be overly modified structurally and electrically. Moreover, the implementation of said method has no repercussion on the user systems, which need not therefore be modified when they use the consolidated position determined with the aid of the method in accordance with the invention.

Although not exclusively, the present invention applies more particularly to an aircraft, and in particular to a transport airplane. In such an application, the position values taken into account, especially in step a) of the method in accordance with the invention, can concern position values which have been produced by various systems and especially by at least one of the aforesaid IR, ADR and GNSS assemblies. In such an application, the method in accordance with the invention:

makes it possible to detect and to exclude, in real time, errors or faults of the systems carried onboard the aircraft, that is to say an IR system, an ADR system and/or a GNSS receiver; and does not degrade the aforesaid RAIM and/or AAIM algorithms which make it possible to detect and to exclude, in real time, errors or faults of a satellite of a GNSS system.

The method in accordance with the invention can be implemented whatever the number of position values available as input, from the moment that at least two different position values are available.

Preferably, said consolidation method in accordance with the invention is implemented in at least two different computers, thereby making it possible to protect this implementation against a possible failure of one of said computers.

In a preferred embodiment, the threshold value used in step a) in a consistency test applied to two position values is calculated on the basis of the radii of two probability spaces which are associated respectively with these two tested position values and which illustrate the respective integrities of these two position values. Preferably, said threshold value corresponds to one of the following values:
- the minimum value of said two radii; or
- the maximum value of said two radii; or
- the sum of said two radii.

It will be noted that the choice of the threshold value plays a significant role in the performance of the consolidation method in accordance with the invention. Indeed, the choice of too small a threshold value may lead to the elimination of a correct position value, while the choice of too large a threshold value may lead to the retaining of an erroneous position value.

Furthermore, in step b), said performance test consists, advantageously:
- in calculating, for each pair of position values Pi and Pj considered, an associated mathematical value, doing so on the basis of the expression |Pi−Pj|+|HPLi−HPLj|, in which HPLi and HPLj are the radii of probability spaces which are associated respectively with the two position values Pi and Pj tested and which illustrate the respective integrities of these two position values Pi and Pj;
- in inter-comparing the various mathematical values thus calculated; and
- in selecting, as pair of position values exhibiting the best reliability, the pair whose associated mathematical value (arising from the aforesaid expression) is the lowest.

Moreover, advantageously, in step c), said consolidated position, as well as the associated probability space, are calculated on the basis at one and the same time:
- of the two position values forming the pair exhibiting the best reliability; and
- of the probability spaces associated respectively with these two position values.

Within the framework of the present invention, these calculations of the consolidated position Pc and of the associated probability space HPLc can be carried out in various ways, on the basis of the values Pi and Pj of the pair exhibiting the best reliability, which comprise probability spaces of radii HPLi and HPLj. In particular, the consolidated position Pc and the radius HPLc of the associated probability space can satisfy one of the following relations:

in a preferred embodiment:

$$\begin{cases} Pc = (Pi + Pj)/2 \\ HPLc = \max(HPLi, HPLj) + |Pi - Pj|/2 \end{cases}$$

in a first variant illustrating an optimization of the integrity of the consolidated position:
if |HPLi−HPLj|<|Pi−Pj|:

$$\begin{cases} Pc = [(Pi + Pj) + (HPLi - HPLj) \cdot (\overrightarrow{PjPi}/PiPj)]/2 \\ HPLc = (HPLi - HPLj + |Pi - Pj|)/2 \end{cases}$$

if |HPLi−HPLj|≧|Pi−Pj|:

$$\begin{cases} Pc \text{ corresponds to the positions } Pi \text{ or } Pj \text{ which exhibits the largest radius } HPLi \text{ or } HPLj \text{ }[\max(HPLi, HPLj)] \\ HPLc = \max(HPLi, HPLj) \end{cases}$$

in a second variant illustrating an optimization of the consolidated position:
if |HPLi−HPLj|<|Pi−Pj|:

$$\begin{cases} Pc = [(Pi + Pj) + (HPLi - HPLj) \times (\overrightarrow{PiPj}/PiPj)]/2 \\ HPLc = \max(HPLi, HPLj) + (|HPLi - HPLj| + |Pi - Pj|)/2 \end{cases}$$

if |HPLi−HPLj|≧|Pi−Pj|:

$$\begin{cases} Pc \text{ corresponds to the positions } Pi \text{ or } Pj \text{ which exhibits the smallestt radius } HPLi \text{ or } HPLj \text{ }[\min(HPLi, HPLj)] \\ HPLc = \max(HPLi, HPLj) + |Pi - Pj| \end{cases}$$

It will be noted that, within the framework of the present invention, the position values may be independent of one another, that is to say not exhibit any common fault mode, etc. Nevertheless, some of these position values may also be dependent on one another and exhibit a certain level of dependency, that is to say have a common hardware element, such as an antenna for example, which can be a common fault source.

In an advantageous manner, when the position values taken into account are independent of one another, a performance test of aforesaid type is carried out in step b), taking account of all the consistent pairs of independent position values.

Furthermore, when at least some of said position values are dependent on one another, a performance test of aforesaid type is carried out in step b), but favoring the consistent pairs of independent position values.

In a preferred embodiment, between steps a) and b) is implemented an intermediate step in which:
- correspondence tests are carried out consisting in inter-comparing, pairwise, all the position values which depend on one another, by calculating the difference between these position values and by comparing this difference with a threshold; and
- a pair of dependent position values is considered not to exhibit any inconsistency and is termed "in harmony", if the difference between these position values is less than said threshold.

In this case, preferably, in step b), all the pairs of position values which are considered to be consistent in step a) are taken into account, and if from among these pairs:
- there exist at least two pairs of independent position values, a performance test of aforesaid type is carried out, with the aid of these (at least two) pairs, so as to obtain the pair exhibiting the best reliability;
- there exists a single pair of independent position values, this pair is considered to be the pair exhibiting the best reliability; and
- there exists no pair of independent position values, but there exist pairs of dependent position values, all these pairs of dependent position values are considered.

In this case, two embodiments are possible, depending on whether the intermediate step, described above, between steps a) and b) (the correspondence tests) does or does not exist.

If the intermediate step between a) and b) exists, and if from among the pairs of dependent position values:
  there exist at least two pairs (of dependent position values) in harmony, a performance test of aforesaid type is carried out, with the aid of these (at least two) pairs, so as to obtain the pair exhibiting the best reliability;
  there exists a single pair (of dependent position values) in harmony, this pair is considered to be the pair exhibiting the best reliability; and
  there exists no pair of dependent position values in harmony, no pair exhibiting the best reliability is obtained.

On the other hand, if the intermediate step between a) and b) does not exist, no pair exhibiting the best reliability is obtained.

The present invention also relates to a device for determining a consolidated position of a traveling object, particularly an aircraft, and especially a transport airplane, on the basis of a plurality of position values which each represent the same current position of said traveling object.

According to the invention, said device is noteworthy in that it comprises:
  first means for carrying out consistency tests intended to verify the consistency of all the pairs of position values, which are formed on the basis of said position values taken into account, a consistency test carried out by said first means and applied to a pair of position values consisting in comparing with a threshold value the distance between the two position values of this pair and in considering this pair to be consistent if and only if this distance is less than or equal to this threshold value;
  second means for identifying, from among the various pairs which are considered to be consistent by said first means, a pair of position values exhibiting the best reliability, by implementing at least one performance test; and
  third means for calculating, on the basis of said pair of position values exhibiting the best reliability, said consolidated position of the traveling object, as well as a probability space which is associated with this consolidated position value and which illustrates its integrity.

The present invention also relates to a system for generating a consolidated position of a traveling object, particularly an aircraft.

According to the invention, said generating system comprises:
  a plurality of position generating means (for example an IR system, an ADR system and/or GNSS means of aforesaid type in the case of an aircraft) which are able to produce position values, each of which represents the current position of said traveling object; and
  a device such as that aforesaid, for determining a consolidated position on the basis of the position values produced by said position generating means.

Moreover, the present invention relates, furthermore, to a traveling object, especially an aircraft, which is furnished with a device such as that aforesaid or with a generating system such as that aforesaid.

BRIEF DESCRIPTION OF THE DRAWINGS

The figures of the appended drawing will elucidate the manner in which the invention may be embodied. In these figures, identical references denote similar elements.

DETAILED DESCRIPTION OF THE INVENTION

Figure 1:
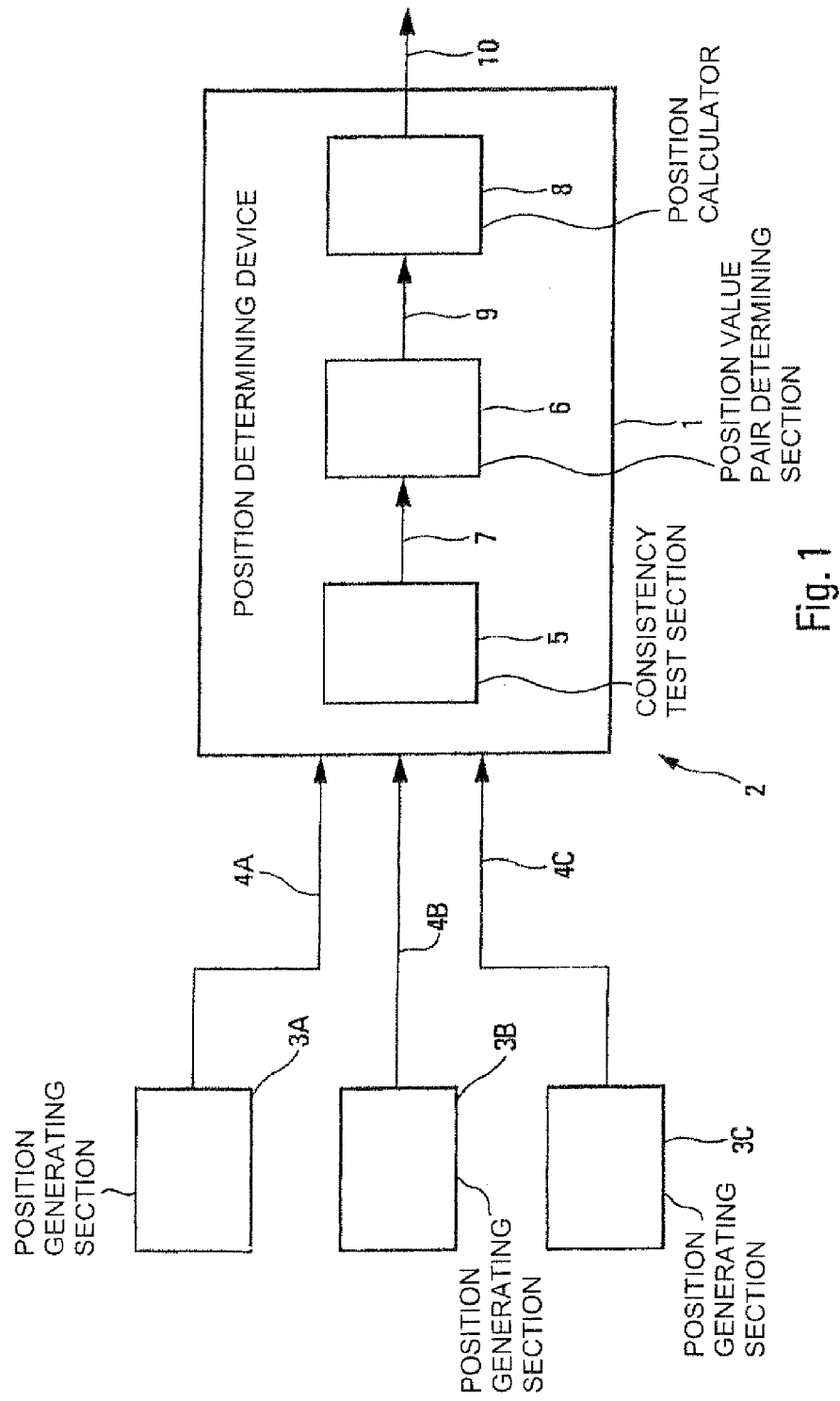
FIG. 1 is the schematic diagram of a device in accordance with the invention.

The device 1 in accordance with the invention and schematically represented in FIG. 1 is onboard a traveling object (not represented), in particular an aircraft and especially a transport airplane, and is intended to determine in real time a consolidated current position Pc of this traveling object.

For this purpose, this device 1 forms part of a system 2 for generating a consolidated position of the traveling object, which comprises, in addition to said device 1, as represented in FIG. 1, a plurality of position generating means 3A, 32, 3C, specified below. These generating means 3A, 3B, 3C are able to produce, in real time, position values, each position value representing the current position of said traveling object, as well as associated probability spaces (specified below), and they are able to transmit these cues respectively by way of links 4A, 4B and 4C to said device 1. The device 1 determines the consolidated current position Pc of the traveling object, on the basis of the position values received from said position generating means 3A to 3C.

For this purpose, said device 1 comprises, according to the invention:
  means 5 for carrying out consistency tests intended to verify the consistency of all the pairs of position values, which are formed on the basis of the various position values which are produced and transmitted by said means 3A to 3C (for one and the same actual position of the traveling object). A consistency test which is carried out by said means 5 on an arbitrary pair of position values P1 and P2 consists in comparing, with a threshold value VS specified below, the distance P1 P2 between the two position values P1 and P2 of this pair and in considering this pair to be consistent if and only if this distance P1 P2 is less than or equal to this threshold value VS;
  means 6 which are connected by way of a link 7 to said means 5 and which are formed so as to identify, from among the various pairs which are considered to be consistent by said means 5, the pair of position values which exhibits the best reliability, by implementing at least one performance test specified below; and
  means 8 which are connected by way of a link 9 to said means 6 and which are formed so as to calculate, on the basis of said pair of position values exhibiting the best reliability (which is received from said means 6), said consolidated position Pc of the traveling object, as well as a probability space which is associated with this consolidated position value Pc and which illustrates its integrity.

The device 1 is able to transmit the consolidated position Pc and the associated probability space, which are calculated by said means 8, to user devices (not represented) of the traveling object, by way of a link 10. These user systems can be all the systems onboard the traveling object, especially computers and display systems, which use a value of the current position of the traveling object.

Thus, the device 1 in accordance with the invention makes it possible to determine a consolidated position Pc of a traveling object and especially of an aircraft, which represents a particularly accurate, reliable and dependable (current) position thereof.

Moreover, said device 1 also makes it possible to determine a probability space which is associated with the calculated consolidated position Pc and which illustrates its integrity. More precisely, within the framework of the present invention, a probability space which is associated with an arbitrary position (consolidated position or position value) of a traveling object, is centered around this position and defines (with the aid of a radius) the volume in which, with a probability greater than a predetermined threshold (for example $10^{-7}$/flying hour or $10^{-9}$/flying hour), the corresponding actual position of the traveling object is situated. This probability space is therefore a value which gives an indication about the integrity and the reliability of the associated position.

Furthermore, the device 1 in accordance with the invention is simple to embody and does not make it necessary to overly modify, structurally and electrically, a system, especially a computer, when it is implanted in such a system. Moreover, the implementation of the invention has no repercussion on the user systems, which need not therefore be modified when they use the consolidated position Pc determined by said device 1 and received especially by way of the link 10.

In a preferred embodiment, said device 1 is duplicated so that the consolidation method in accordance with the invention is implemented in at least two different computers, thereby making it possible to protect this implementation against a possible failure of one of said computers.

In a preferred embodiment, to be able to implement a consistency test on arbitrary position values P1 and P2, said means 5 comprise:
  an element (not represented) for determining the threshold value VS which depends on the radii HPL1 and HPL2 of the probability spaces (illustrated by circles C1 and C2 in FIGS. 2A to 4B) associated with the two position values P1 and 22 tested; and
  an element (not represented) for calculating the distance P1 P2 (with P1P2=|P1−P2|) between these two position values P1 and P2 and for comparing it with said threshold value VS, so that, if said distance P1P2 is greater than this threshold value VS, a problem of reliability (or of consistency) exists between these two position values P1 and P2 tested.

Figure 2A:
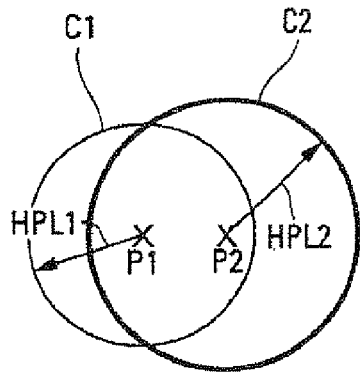
FIGS. 2A, 2B, 3A, 3B, 4A and 4B are diagrams which make it possible to properly explain the characteristics of a consistency test in accordance with the invention.
Figure 2B:
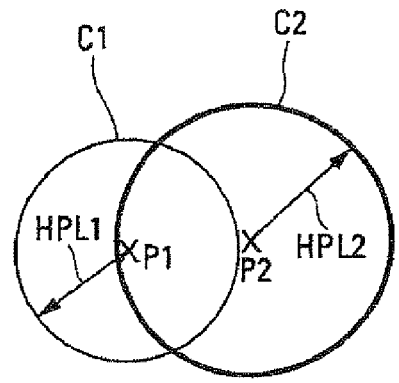

In a first variant represented in FIGS. 2A and 2B, said threshold value VS corresponds to the minimum value of the radii HPL1 and HPL2. In this case:
  in the example of FIG. 2A, as P1 P2<VS, the two values P1 and P2 are mutually consistent; and
  in the example of FIG. 2B, as P1 P2>VS, the two values P1 and P2 are not mutually consistent.

In this first variant, the pair of position values P1 and P2 is therefore consistent, if each circle C1, C2 illustrating a probability space encompasses the center of the other circle, so that the two circles C1 and C2 are sufficiently close to one another. Indeed, if the two circles are not sufficiently close to one another, a position value P1 or P2 or an associated integrity protection limit (or probability space) HPL1 or HPL2 is erroneous.

Figure 3A:
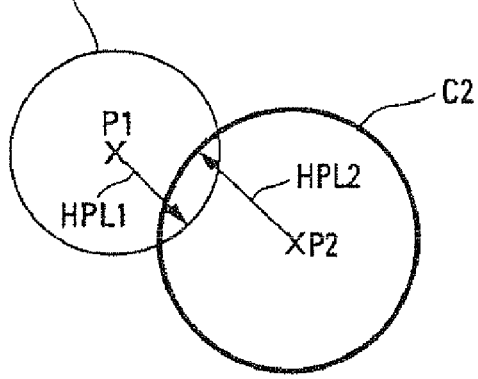
Figure 3B:
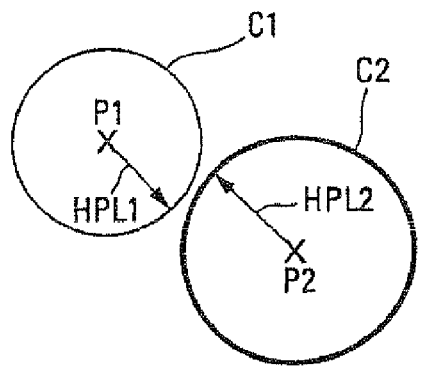

In a second variant represented in FIGS. 3A and 3B, said threshold value VS corresponds to the sum of the radii HPL1 and HPL2. In this case:
  in the example of FIG. 3A, as P1 P2<VS, the two values P1 and P2 are mutually consistent; and
  in the example of FIG. 3B, as P1 P2>VS, the two values P1 and P2 are not mutually consistent.

In this second variant, the pair of position values P1 and P2 is therefore consistent, if the two corresponding circles C1 and C2 exhibit an intersection, so that the two circles C1 and C2 are sufficiently close to one another. Indeed, if the two circles are not sufficiently close to one another, a position value P1 or P2 or an associated integrity protection limit (or probability space) HPL1 or HPL2 is erroneous.

Figure 4A:
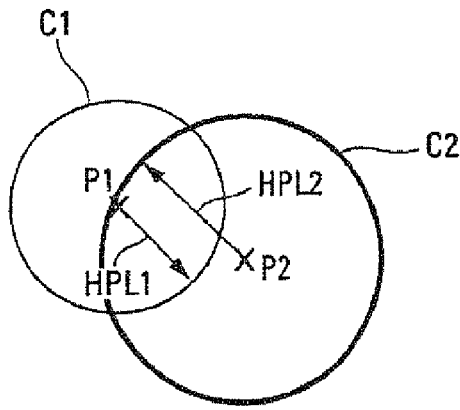
Figure 4B:
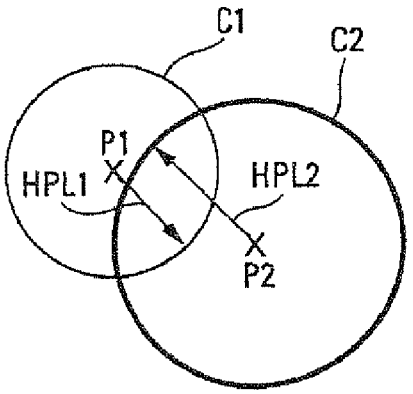

Furthermore, in a third variant represented in FIGS. 4A and 4B, said threshold value VS corresponds to the maximum value of the radii HPL1 and HPL2. In this case:
  in the example of FIG. 4A, as P1 P2<VS, the two values P1 and P2 are mutually consistent; and
  in the example of FIG. 42, as P1 P2>VS, the two values P1 and P2 are not mutually consistent.

In this third variant, the pair of position values P1 and P2 is therefore consistent, if at least one circle C1, C2 encompasses the center P1, P2 of the other circle, so that the two circles C1 and C2 are sufficiently close to one another. Indeed, if the two circles are not sufficiently close to one another, a position value P1 or P2 or an associated integrity protection limit (or probability space) HPL1 or HPL2 is erroneous.

It will be noted that the choice of the threshold value VS plays a significant role in the performance of the consolidation method implemented by the device 1 in accordance with the invention. Indeed, the choice of too small a threshold value VS may lead to the elimination of a correct position value, while the choice of too large a threshold value VS may lead to the retaining of an erroneous position value.

Furthermore, it will be noted that for a given configuration of the two position values P1 and P2 and of their associated probability spaces HPL1 and HPL2, the consistency test and the choice of the threshold value VS have no impact on the calculation of the consolidated position Pc, or on the calculation of the probability space HPLc associated with this consolidated position Pc. On the other hand, the consistency test and the choice of the threshold value VS have a direct impact on the maximum value that the probability space will be able to attain, and therefore on the availability performance of the consolidated position Pc.

Moreover, to be able to implement said performance test, said means 6 comprise the following elements, integrated and not represented specifically:
  an element for calculating, for each pair of position values Pi and Pj considered, an associated mathematical value, doing so on the basis of the mathematical expression |Pi−Pj|+|HPLi−HPLj|. In this mathematical expression, HPLi and HPLj are the radii of the probability spaces which are associated respectively with the two position values Pi and Pj tested and which illustrate the respective integrities of these two position values Pi and Pj;
  an element for inter-comparing the various mathematical values thus calculated; and
  an element for selecting, as pair of position values exhibiting the best reliability, the pair whose associated mathematical value is the lowest, by taking account of the comparisons carried out by the previous element.

It will be noted that in the absence of any fault, all the position values taken into account are assumed to have nearly the same position (corresponding to the actual current position of the traveling object). Hence, a quantity |Pi−Pj| that is fairly significant is indeed the consequence of a fault relating to the generation of one of the two position values Pi and Pj taken into account. Moreover, in the absence of any fault, all the position values are assumed to have nearly the same probability space. Hence, a quantity |HPLi−HPLj| that is fairly significant is indeed the consequence of a fault relating to the generation of one of the two probability spaces HPLi and HPLj.

Moreover, the means 8 calculate said consolidated position Pc, as well as the associated probability space (of radius HPLc), on the basis of the two position values Pi, Pj forming the pair exhibiting the best reliability, as well as of the probability spaces HPLi, HPLj associated respectively with these two position values Pi, Pj, cues which are received from said means 6. Accordingly, said means 8 comprise the following elements, integrated and not represented specifically:

an element for calculating the consolidated position Pc; and an element for calculating the probability space HPLc which is associated with this consolidated position Pc.

Within the framework of the present invention, these calculations of the consolidated position Pc and of the associated probability space (of radius HPLc) can be carried out in various ways, on the basis of the position values Pi and Pj of the pair exhibiting the best reliability, which comprise probability spaces of radii HPLi and HPLj.

In a preferred embodiment, the consolidated position Pc and the radius HPLc of the associated probability space satisfy the following relations:

$$\begin{cases} Pc = (Pi + Pj)/2 \\ HPLc = \max(HPLi, HPLj) + |Pi - Pj|/2 \end{cases}$$

in which the expression max(HPLi, HPLj) represents the maximum value of the two radii HPLi and HPLj.

In this preferred embodiment, the consolidated position Pc is therefore calculated as the center of the position values Pi and Pj forming the pair exhibiting the best reliability, and the probability space is calculated as the smallest circle which is centered on this consolidated position Pc and which contains at least the two circles (of radii HPLi and HPLj) relating to the probability spaces associated with said pair exhibiting the best reliability.

A first variant embodiment relating to the calculation of the consolidated position Pc and of the associated probability space HPLc relates to an optimization of the integrity of the consolidated position. It is known that the circle relating to HPLc is not necessarily the smallest circle encompassing the two circles relating to HPLi and HPLj. The principle of this first variant embodiment is to minimize the circle relating to HPLc. In fact, the circle which is tangent to the two circles of the two position values Pi and Pj is smaller and offers the same integrity level. This first variant embodiment therefore consists firstly in calculating this tangent circle and in taking it as circle of radius HPLc, and then in determining the consolidated position Pc as the center of this circle of radius HPLc. Two cases need to be considered in this first variant embodiment.

A first case arises when:

$|HPLi-HPLj|<|Pi-Pj|$.

In this first case, the consolidated position Pc corresponds to the weighted barycenter of the position values Pi and Pj, that is to say Pc=q·Pj+(1−q)·Pi.

Moreover, q is defined by the following equation:

$q=[1+(HPLj-HPLi)/|Pi-Pj|]/2$

It will be noted that, in this first case, the value $|Pi-Pj|$ cannot be equal to zero. In such a case, we therefore obtain:

$$\begin{cases} Pc = [(Pi + Pj) + (HPLi - HPLj) \cdot (\overrightarrow{PjPi}/PiPj)]/2 \\ HPLc = (HPLi - HPLj + |Pi - Pj|)/2 \end{cases}$$

In this first case of said first variant embodiment:

HPLc is smaller than in the aforesaid preferred embodiment, this being advantageous;

the consolidated position Pc is shifted with respect to the center of the two position values Pi and Pj, by a factor which is equal to half the difference between HPLi and HPLj, said shift being towards the position value which exhibits the largest probability space; and if HPLi=HPLj, the consolidated position Pc is the center of the two position values Pi and Pj.

Furthermore, a second case relating to said first variant embodiment arises when:

$|HPLi-HPLj| \geq |Pi-Pj|$

In this second case, a circle of one position value is considered to be entirely included in the circle of the other position value. In this case, the position value exhibiting the larger probability space can be chosen as consolidated position Pc and the larger circle can be chosen as circle defining the probability space of Pc. This circle does indeed encompass the two circles of the two position values.

In this second case, Pc corresponds to the position Pi or Pj which exhibits the larger radius HPLi or HPLj [max(HPLi, HPLj)], and HPLc satisfies:

$HPLc=\max(HPLi,HPLj)$.

It will be noted that the transition between the aforesaid first and second cases does not give rise to any discontinuity, either in respect of the consolidated position, or in respect of the associated (consolidated) probability space.

Moreover, a second variant embodiment relating to the calculation of the consolidated position Pc and of the associated probability space, achieves an optimization of said consolidated position.

In this second variant embodiment, the means 8 determine a consolidated position which still belongs to the intersection of the two probability spaces of the two position values taken into account.

In this second variant embodiment, two cases are also to be considered.

In a first case, for which $|HPLi-HPLj|<|Pi-Pj|$, we obtain:

$$\begin{cases} Pc = [(Pi + Pj) + (HPLi - HPLj) \times (\overrightarrow{PjPi}/PiPj)]/2 \\ HPLc = \max(HPLi, HPLj) + (|HPLi - HPLj| + |Pi - Pj|)/2 \end{cases}$$

In this first case, the consolidated position Pc is shifted with respect to the center of the two individual position values by the same factor as in the first aforesaid variant embodiment, but this time towards the position which exhibits the smallest probability space, this being favorable.

Furthermore, in a second case, for which $|HPLi-HPLj| \geq |Pi-Pj|$, Pc corresponds to the position Pi or Pj which exhibits the smallest radius HPLi or HPLj, and HPLC satisfies:

$HPLc=\max(HPLi,HPLj)+|Pi-Pj|$

Although not exclusively, the device 1 in accordance with the invention applies more particularly to an aircraft, and in particular to a transport airplane. In this case said position generating means 3A, 3B and 3C can be various systems for positioning the aircraft, and in particular an Inertial Reference (IR) system, an Air Data Reference (ADR) system, and/or GNSS means which form part of a satellite positioning system of GNSS type ("Global Navigation Satellite System").

In a particular embodiment, said means 3A to 3C correspond to IR systems which each calculate, in a customary manner, as position value, a hybrid position on the basis of cues obtained from said IR and ADR systems and said GNSS means.

Furthermore, in a preferred embodiment, said means 3A, 3B and 3C are independent of one another and do not comprise any common elements so that the position values produced respectively by these means 3A to 3C are also independent of one another. In this case, said means 6 carry out a performance test of aforesaid type, taking account of all the pairs of independent position values, which were considered to be consistent by said means 5.

Figure 5:
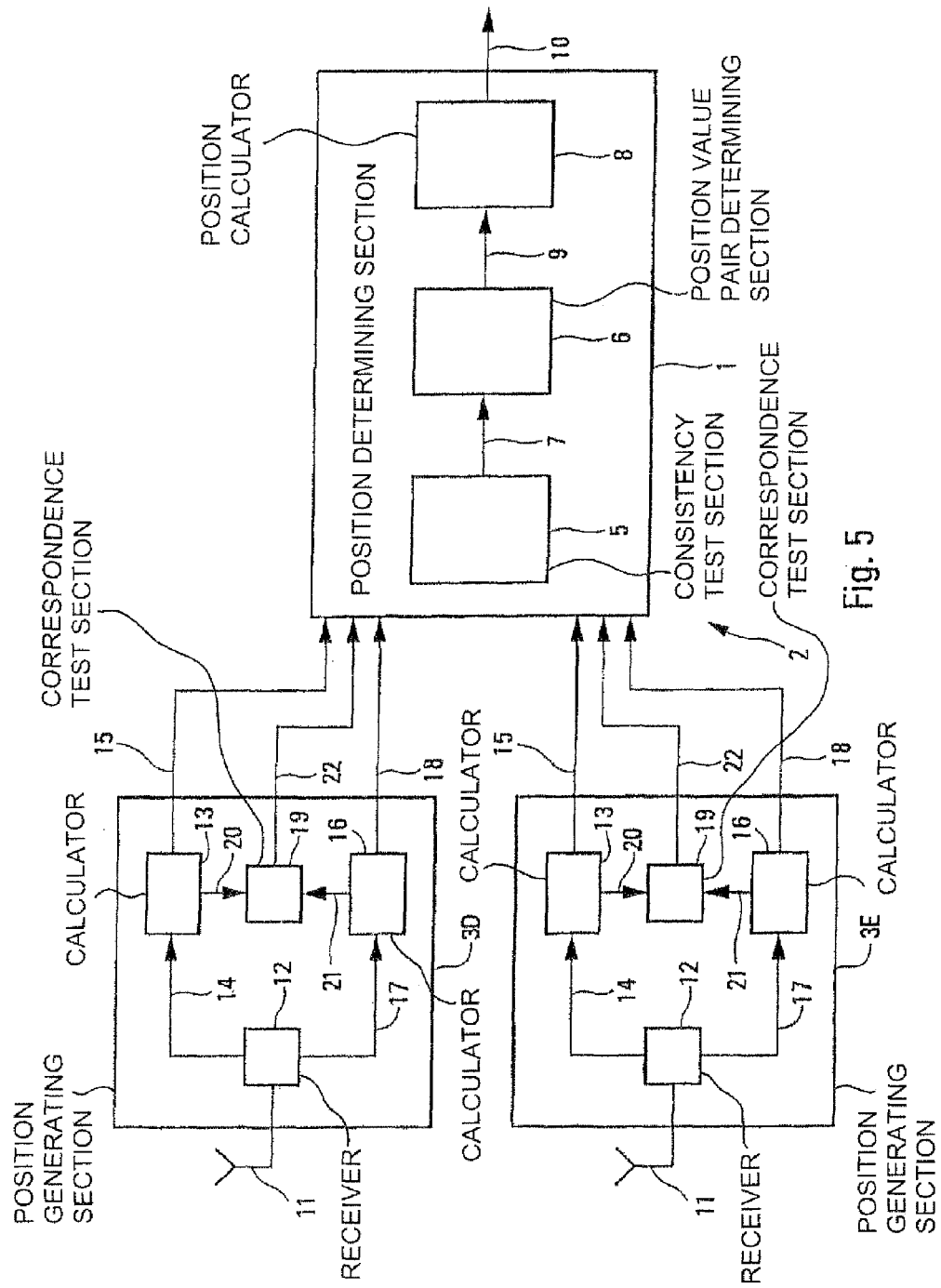
FIG. 5 is the schematic diagram of a particular embodiment of a device in accordance with the invention.

Moreover, in another embodiment represented in FIG. 5, each of said position generating means 3D and 3E generates two position values which are dependent on one another, that is to say which are produced using at least one common hardware element.

In a particular embodiment, each of said means 3D and 3E represents a unit which is associated with a satellite positioning system, preferably a global navigation satellite system of GNSS type which encompasses the gamut of existing satellite navigation systems (GPS, GALILEO, etc). In this case, each of these units 3D and 3E comprises:
 a customary receiver 12 which is furnished with an antenna 11, and which makes it possible in particular to receive cues from satellites forming part of said satellite positioning system;
 a calculation element 13 (or calculation chain) which is connected by way of a link 14 to said receiver and which is formed so as to determine, in a customary manner, on the basis of the cues received, a first position value, which it transmits by way of a link 15 to the device 1; and
 a calculation means 16 (or calculation chain) which is similar to the calculation means 13, which is connected by way of a link 17 to said receiver 12, and which is also formed so as to determine, in a customary manner, on the basis of the cues received, a second position value, which it transmits by way of a link 18 to said device 1.

The two position values relating to one and the same position of the traveling object which are transmitted respectively by the links 15 and 18 of one and the same unit 3D, 3E are therefore dependent, since the unit 3D, 3E uses a common receiver 12 and a common antenna 11 to produce these two position values.

In the particular embodiment represented in FIG. 5, each of said units 3D and 3E comprises, moreover, means 19 which are connected respectively by way of links 20 and 21 to said calculation elements 13 and 16 and which are formed so as to carry out tests of correspondence between two position values determined simultaneously by these calculation means 13 and 16.

For this purpose, said means 19 inter-compare, pairwise, the position values which depend on one another, that is to say the position values which are produced respectively by said calculation elements 13 and 16 for one and the same current position of the traveling object. Accordingly, said means 19 calculate the difference between the dependent position values of a given pair and compare this difference with a threshold. They consider that a pair of dependent position values does not exhibit any inconsistency and is termed "in harmony", if the difference between these two dependent position values is less than said threshold. Said means 19 thereafter transmit the results of these correspondence tests, by way of a link 22, to said device 1 which takes account thereof (especially by way of the means 6) in the calculation of Pc and HPLc.

In this case, in a preferred embodiment, said means 6 take into account all the pairs of values which are considered to be consistent by said means 5. Moreover, if among these pairs:
 there exist at least two pairs of independent position values, the means 6 carry out, with the aid of these (at least two) pairs, a performance test of aforesaid type so as to obtain the pair exhibiting the best reliability. In the example of FIG. 2, two position values are independent when one is produced by the means 3D and the other is produced by the means 3E, said means 3D and 3E not having any common hardware element;
 there exists a single pair of independent position values, the means 6 consider this pair to be the pair exhibiting the best reliability; and
 there exists no pair of independent position values, but there exist pairs of dependent position values (that is to say position values produced either by the means 3D, or by the means 3E), the means 6 consider all these pairs of dependent position values (as well as the results of the correspondence tests relating to these pairs, which have been implemented by the means 19).

In this case, if among these pairs (of dependent position values):
 there exist at least two pairs (of dependent position values) which are considered to be in harmony by the means 19, said means 6 carry out, with the aid of these (at least two) pairs, a performance test of aforesaid type so as to obtain the pair exhibiting the best reliability;
 there exists a single pair (of dependent position values) in harmony, the means 6 consider this pair to be the pair exhibiting the best reliability; and
 there exists no pair of dependent position values in harmony, the means 6 consider that no pair exhibiting the best reliability can be determined. In this case, no consolidated position Pc can be calculated.

Consequently, in this preferred embodiment, when the device 1 processes, at one and the same time, dependent position values and independent position values, said means 6 take said independent position values into account by priority.

It will be noted that the remainder of the elements of the system 2 (and especially of the device 1) of FIG. 5 is similar to the elements exhibiting the same references of the system 2 of FIG. 1. Hence, the corresponding description relating to FIG. 1 is returned to in order to ascertain the embodiment and the operating mode of these similar elements (and especially of the means 5 and 8).

Moreover, in a simplified variant embodiment, in the presence of dependent position values, said means 6 can also simply carry out a performance test of aforesaid type, taking account in the same manner of all the consistent pairs of dependent and independent position values. This simplified variant embodiment avoids in particular the need to provide means 19 for implementing correspondence tests.

The invention claimed is:

1. A method for determining a consolidated position of a traveling object, particularly an aircraft, on the basis of a plurality of position values which each represent the same current position of said traveling object, said method comprising:
 a) carrying out consistency tests to verify the consistency of all the pairs of position values, which are formed on the basis of said position values, a consistency test applied to a pair of position values consisting in comparing with a threshold value the distance between the two position values of this pair and in considering this pair to be consistent if and only if this distance is less than or equal to this threshold value;

b) from among the various pairs which are considered to be consistent in step a), identifying a pair of position values exhibiting the best reliability by implementing at least one performance test, said performance test consisting:
  in calculating, for each pair of position values Pi and Pj considered, an associated mathematical value, on the basis of the expression |Pi−Pj|+|HPLi−HPLj|, in which HPLi and HPLj are the radii of probability spaces which are associated respectively with the two position values Pi and Pj tested and which illustrate the respective integrities of these two position values Pi and Pj;
  in inter-comparing the various mathematical values thus calculated; and
  in selecting, as a pair of position values exhibiting the best reliability, the pair whose associated mathematical value is the lowest; and
c) calculating said consolidated position of the traveling object, as well as a probability space which is associated with this consolidated position value and which illustrates its integrity, on the basis of said pair of position values exhibiting the best reliability.

2. The method as claimed in claim 1, wherein in step a), the threshold value used in a consistency test applied to two position values, is calculated on the basis of the radii of two probability spaces which are associated respectively with these two tested position values and which illustrate the respective integrities of these two tested position values.

3. The method as claimed in claim 1, wherein in step e), said consolidated position, as well as the associated probability space, are calculated on the basis of the two position values forming the pair exhibiting the best reliability, as well as of the probability spaces associated respectively with these two position values.

4. The method as claimed in any claim 1, wherein said position values are independent of one another, and in step b), a performance test is carried out by taking account of all the consistent pairs of independent position values.

5. The method as claimed in claim 1, wherein at least some of said position values are dependent on one another, and in step b), a performance test is carried out by taking account of all the consistent pairs of dependent and independent position values.

6. The method as claimed in claim 1, wherein at least some of said position values are dependent on one another, and between steps a) and b), an intermediate step is carried out in which:
  correspondence tests are carried out consisting in inter-comparing, pairwise, all the position values which depend on one another, by calculating the difference between these position values and by comparing this difference with a threshold; and
  a pair of dependent position values is considered to be in harmony, if the difference between these position values is less than said threshold.

7. The method as claimed in claim 6, wherein in step b), all the pairs of position values which are considered to be consistent in step a) are taken into account, and if from among these pairs:
  there exist at least two pairs of independent position values, a performance test is carried out, with the aid of these pairs, so as to obtain the pair exhibiting the best reliability;
  there exists a single pair of independent position values, this pair is considered to be the pair exhibiting the best reliability; and
  there exists no pair of independent position values, but there exist pairs of dependent position values, all these pairs of dependent position values are considered and if from among these pairs:
  there exist at least two pairs of dependent position values in harmony, a performance test is carried out, with the aid of these pairs, so as to obtain the pair exhibiting the best reliability;
  there exists a single pair of dependent position values in harmony, this pair is considered to be the pair exhibiting the best reliability; and
  there exists no pair of dependent position values in harmony, no pair exhibiting the best reliability is obtained.

8. A device for determining a consolidated position of a traveling object, particularly an aircraft, on the basis of a plurality of position values which each represent the same current position of said traveling object, said device comprising:
  a first means for carrying out consistency tests intended to verify the consistency of all the pairs of position values, which are formed on the basis of said position values, a consistency test carried out by said first means and applied to a pair of position values consisting in comparing with a threshold value the distance between the two position values of this pair and in considering this pair to be consistent if and only if this distance is less than or equal to this threshold value;
  a second means for identifying, from among the various pairs which are considered to be consistent by said first means, a pair of position values exhibiting the best reliability, by implementing at least one performance test, said performance test consisting:
    in calculating, for each pair of position values Pi and Pj considered, an associated mathematical value, on the basis of the expression |Pi−Pj|+|HPLi−HPLj| in which HPLi and HPLj are the radii of probability spaces which are associated respectively with the two position values Pi and Pj tested and which illustrate the respective integrities of these two position values Pi and Pj;
    in inter-comparing the various mathematical values thus calculated; and
    in selecting, as a pair of position values exhibiting the best reliability, the pair whose associated mathematical value is the lowest; and
  a third means for calculating, on the basis of said pair of position values exhibiting the best reliability, said consolidated position of the traveling object, as well as a probability space which is associated with this consolidated position value and which illustrates its integrity.

9. A system for generating a consolidated position of a traveling object, particularly an aircraft, said system comprising:
  a plurality of position generating means, which are configured to produce position values, each of which represents the current position of said traveling object; and
  a device as in claim 8, for determining a consolidated position on the basis of the position values produced by said position generating means.

* * * * *